United States Patent
Yang et al.

(10) Patent No.: US 8,005,175 B2
(45) Date of Patent: Aug. 23, 2011

(54) METHOD AND APPARATUS FOR INTERFERENCE MITIGATION IN AN OFDMA-BASED COMMUNICATION SYSTEM

(75) Inventors: Yunsong Yang, San Diego, CA (US); Anthony C. K. Soong, Plano, TX (US); Jianmin Lu, San Diego, CA (US); Jung Woon Lee, Allen, TX (US)

(73) Assignee: FutureWei Technologies, Inc., Plano, TX (US)

( * ) Notice: Subject to any disclaimer, the term of this patent is extended or adjusted under 35 U.S.C. 154(b) by 641 days.

(21) Appl. No.: 11/684,931

(22) Filed: Mar. 12, 2007

(65) Prior Publication Data
US 2007/0223606 A1 Sep. 27, 2007

Related U.S. Application Data

(60) Provisional application No. 60/783,265, filed on Mar. 17, 2006.

(51) Int. Cl.
*H03D 1/04* (2006.01)
(52) U.S. Cl. ........................................................ 375/346
(58) Field of Classification Search .................. 370/235, 370/412, 319, 203, 448; 375/260, 340, 346; 455/442, 450, 522, 447
See application file for complete search history.

(56) References Cited

U.S. PATENT DOCUMENTS

| | | | | |
|---|---|---|---|---|
| 5,867,478 A | * | 2/1999 | Baum et al. | 370/203 |
| 6,571,099 B1 | * | 5/2003 | Kim et al. | 455/442 |
| 6,970,416 B1 | * | 11/2005 | McGibney | 370/203 |
| 6,980,811 B2 | | 12/2005 | Harris | |
| 7,206,320 B2 | * | 4/2007 | Iwamura | 370/448 |
| 2002/0152342 A1 | | 10/2002 | Das et al. | |
| 2003/0017830 A1 | * | 1/2003 | Kayama et al. | 455/450 |
| 2003/0067935 A1 | | 4/2003 | Hosein | |
| 2004/0258026 A1 | | 12/2004 | Lau | |
| 2005/0111488 A1 | | 5/2005 | Subramanian et al. | |
| 2005/0141454 A1 | | 6/2005 | Jain et al. | |
| 2005/0180349 A1 | * | 8/2005 | Alamouti et al. | 370/319 |
| 2005/0197129 A1 | * | 9/2005 | Cho et al. | 455/447 |
| 2005/0265434 A1 | * | 12/2005 | Watanabe | 375/150 |
| 2006/0003794 A1 | * | 1/2006 | Chung et al. | 455/522 |
| 2006/0094363 A1 | | 5/2006 | Kang et al. | |
| 2006/0256887 A1 | | 11/2006 | Kwon et al. | |

(Continued)

OTHER PUBLICATIONS

Kitroser, I., et al., "OFDMA MAC-PHY Section Details," IEEE 802.16 Broadband Wireless Access Working Group, Aug. 29, 2001, pp. 0-19, IEEE.

(Continued)

*Primary Examiner* — David C. Payne
*Assistant Examiner* — Leon-Viet Q Nguyen
(74) *Attorney, Agent, or Firm* — Slater & Matsil, L.L.P.

(57) ABSTRACT

A method and apparatus for mitigating inter-cell interference in an OFDMA-based wireless communication system is disclosed. The method includes the steps of, providing at least a frame in a base station to a plurality of mobile stations; dividing the frame into a plurality of subcarriers; assigning a demarcation line within the frame to divide the plurality of subcarriers into a first zone and a second zone; defining a time reuse parameter for the plurality of subcarriers within the first zone; defining a frequency reuse parameter for the plurality of subcarriers within the first zone; and loading the plurality of subcarriers within the first zone according the time reuse parameter and the frequency parameter.

29 Claims, 13 Drawing Sheets

U.S. PATENT DOCUMENTS

| | | | |
|---|---|---|---|
| 2007/0004437 A1 | 1/2007 | Harada et al. | |
| 2007/0070905 A1* | 3/2007 | Oliver et al. | 370/235 |
| 2007/0201398 A1 | 8/2007 | Yang et al. | |
| 2007/0206623 A1 | 9/2007 | Tiedemann, Jr. et al. | |
| 2007/0218915 A1 | 9/2007 | Yang et al. | |
| 2007/0263711 A1 | 11/2007 | Theodor Kramer et al. | |
| 2007/0263735 A1* | 11/2007 | Tong et al. | 375/260 |
| 2007/0268816 A1 | 11/2007 | Hosein | |
| 2008/0037664 A1 | 2/2008 | Yang et al. | |
| 2008/0219363 A1* | 9/2008 | Li et al. | 375/260 |
| 2009/0080575 A1* | 3/2009 | Chuang et al. | 375/340 |
| 2009/0196164 A1 | 8/2009 | Vook et al. | |

OTHER PUBLICATIONS

"Downlink Multiplexing for EUTRA," 3GPP TSG-RAN WG1 Meeting #42bis, Tdoc R1-051220, Oct. 10-14, 2005, 5 pages, Samsung.

"E-URTA Resource Allocation Design for Downlink," 3GPP TSG-RAN WG1 #43, R1-051359, Nov. 7-11, 2005, 12 pages, ZTE.

"Updated Lucent-Nortel-Samsung proposal for Air Interface Evolution Phase 2," 3GPP2 TSG-C WG3, C30-20060327-018, Mar. 30, 2006, pp. 1, 29-34, 3GPP2.

Song, G., et al., "Adaptive Subcarrier and Power Allocation in OFDM Based on Maximizing Utility," The $57^{th}$ IEEE Semiannual Vehicular Technology Conference, Apr. 22-25, 2003, 5 pages.

* cited by examiner

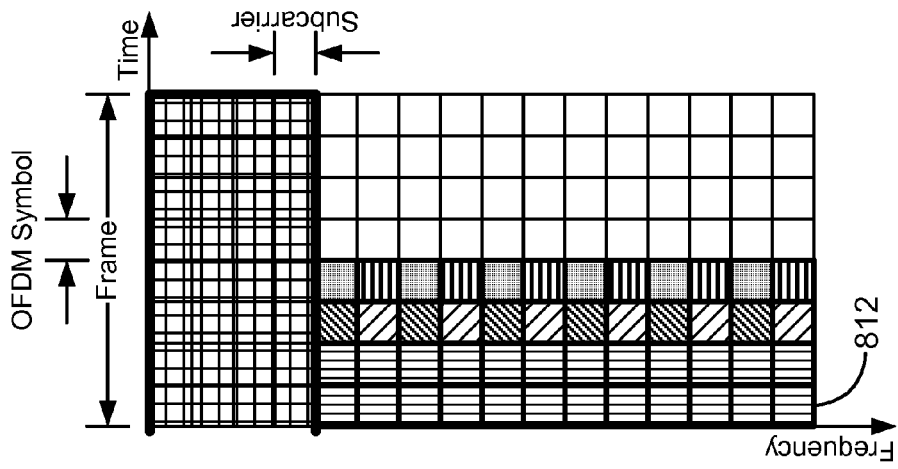
BS 806   FIG. 8C
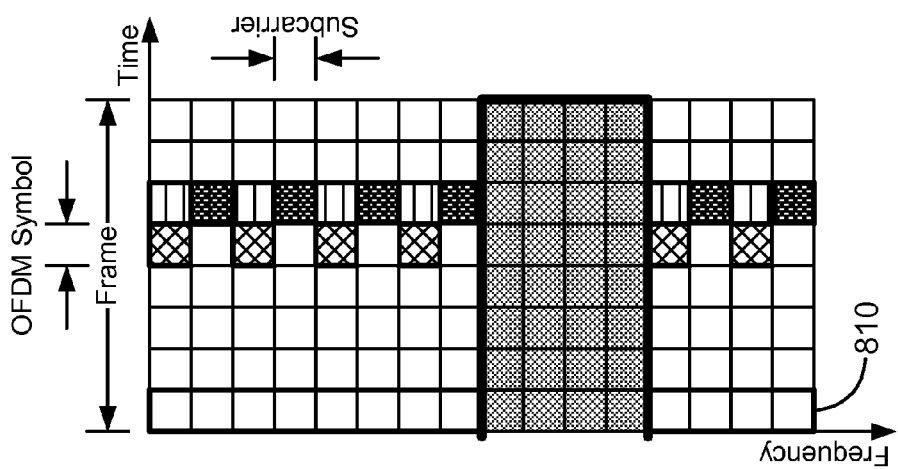
BS 804   FIG. 8B
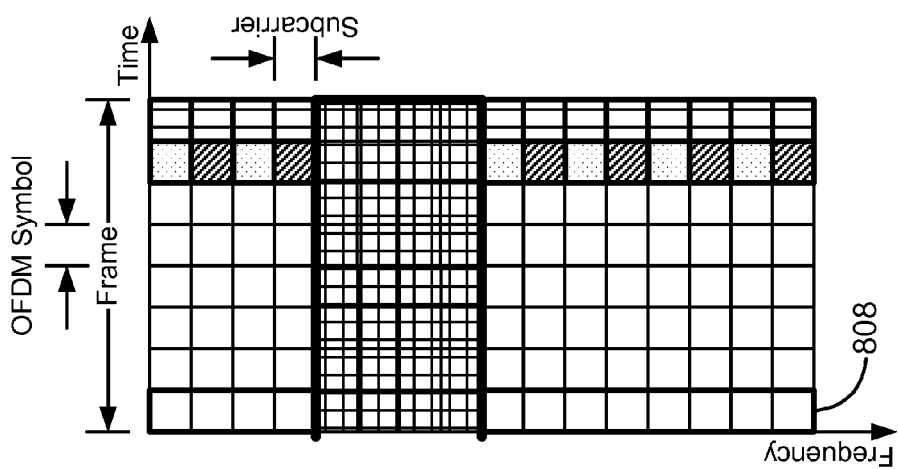
BS 802   FIG. 8A After Group Frequency Hopping Before Group Frequency Hopping

METHOD AND APPARATUS FOR INTERFERENCE MITIGATION IN AN OFDMA-BASED COMMUNICATION SYSTEM

PRIORITY CLAIM AND CROSS-REFERENCE TO RELATED APPLICATIONS

This application claims priority to and benefit of U.S. Provisional Application Ser. No. 60/783,265, filed Mar. 17, 2006, entitled "METHOD AND APPARATUS FOR INTERFERENCE MITIGATION IN AN OFDMA-BASED COMMUNICATION SYSTEM" by inventors, Yunsong Yang, Anthony Soong, Jianmin Lu and Jung Woon Lee.

This application is related to the co-pending U.S. patent application Ser. No. 11/679,060, filed Feb. 26, 2007, entitled "METHOD AND APPARATUS FOR WIRELESS RESOURCE ALLOCATION", assigned to the assignee hereof and hereby expressly incorporated be reference herein.

TECHNICAL FIELD OF THE INVENTION

The present invention relates generally to wireless communications systems, and more particularly, to novel methods and apparatus for interference mitigation in communication systems.

BACKGROUND OF THE INVENTION

In a wideband wireless communications system, a signal tends to decrease from frequency selective fading due to multi-path transmissions. An orthogonal frequency division multiplexing (OFDM) system has been proposed to overcome the problem of frequency selective fading by dividing the total bandwidth into a plurality of subcarriers such that each subcarrier bandwidth is sufficiently narrow to enable data modulation symbols to be carried by that subcarrier with relatively flat fading.

The orthogonal frequency division multiple access (OFDMA) system uses an OFDM modulation technique to multiplex the traffic data of a plurality of mobile stations by both frequency and time. In a cellular communication network based on OFDMA, the base station communicates with the mobile stations that are within coverage by using signals that are orthogonal in frequency, and therefore eliminate intra-cell interference. However, some inter-cell interference still exists that comes from the signals of the adjacent base stations as well as the mobile stations within coverage of those base stations; this inter-cell interference degrades network performance in cell coverage as well as system throughput.

SUMMARY OF THE INVENTION

Given the previously described state of the art, the present invention contemplates that improved methods and apparatus to combat inter-cell interference are now needed. In response, the present invention discloses novel methods and apparatus for mitigating inter-cell interference in a cellular system, particularly in an OFDMA-based wireless communication system.

The methods and apparatus of the present invention first divide a frame from a base station to a mobile station into a plurality of subcarriers based on certain time and frequency intervals, and then divide the plurality of subcarriers into two zones—where one of the two zones is designated for dynamic radio resource assignment. Further, a time reuse parameter or a frequency reuse parameter, or a combination of two such parameters, are defined to establish a plurality of schemes for dynamically loading the subcarriers within one of the designated zones. As a result, inter-cell interference may be avoided or mitigated in a cellular system.

Other reuse schemes that may be provided in accordance with the present invention include: a soft time reuse scheme, a group frequency hopping scheme, a group time hopping scheme, a subcarrier time hopping scheme, or a combination of any two or more of the above.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A, 8B, and 8C together illustrate another embodiment of interference avoidance according to the present invention;

DETAILED DESCRIPTION

The present invention provides unique methods and apparatus for interference mitigation in an OFDMA-based communication system. It is understood, however, that the following disclosure provides many different embodiments, or examples, for implementing different features of the invention. Specific examples of components, circuits, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

The present invention minimizes inter-cell interference—experienced by mobile stations that are assigned distributed assignments, which tend to be disadvantaged mobile stations—by time reuse, or a combination of time and frequency reuse within a frame, thereby improving the cell coverage through interference avoidance. The present invention further provides such functionality in a static, as well as dynamic, manner; while optimizing signal reliability and overhead.

The present invention supports macro diversity, wherein more than one base station's antennas transmit the same signal waveform to a mobile station, using the same frequency-time resource. The present invention further supports soft time re-use in a distributed assignment zone. The present invention also randomizes inter-cell interference in a distributed assignment zone.

Figure 1:
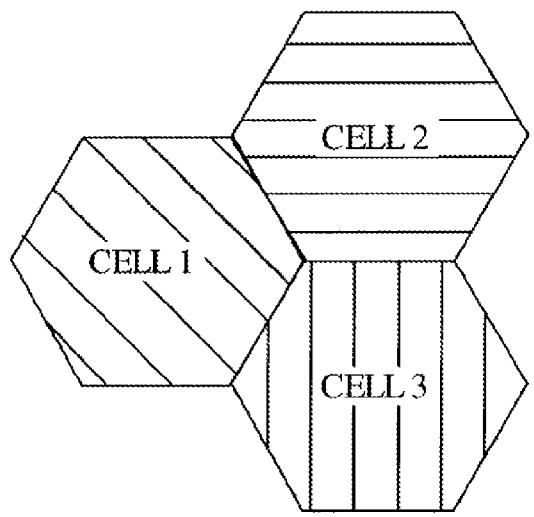
FIG. 1 shows a frequency reuse scheme among a plurality of cells in a cellular system.

Now referring to FIG. 1, a diagram is shown utilizing a frequency reuse scheme among a plurality of cells in a cellular system.

Figure 2:
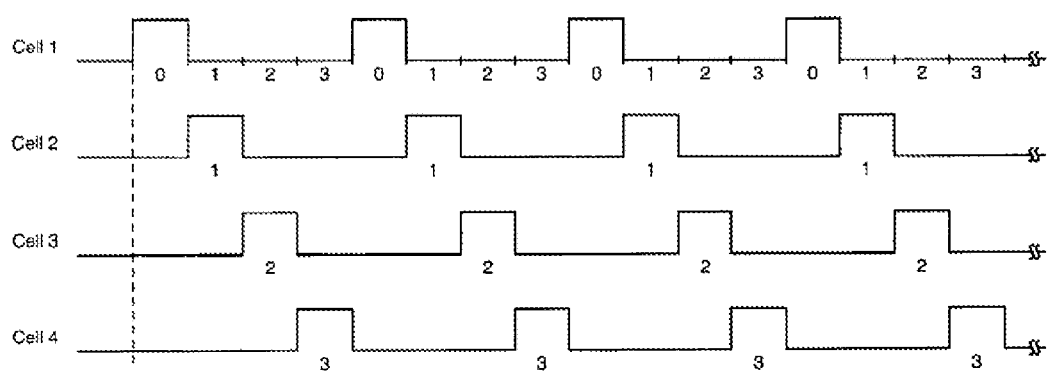
FIG. 2 shows a time reuse scheme among a plurality of cells in a cellular system.

Now referring to FIG. 2, a diagram is shown utilizing a time reuse scheme among a plurality of cells in a cellular system.

Figure 3:
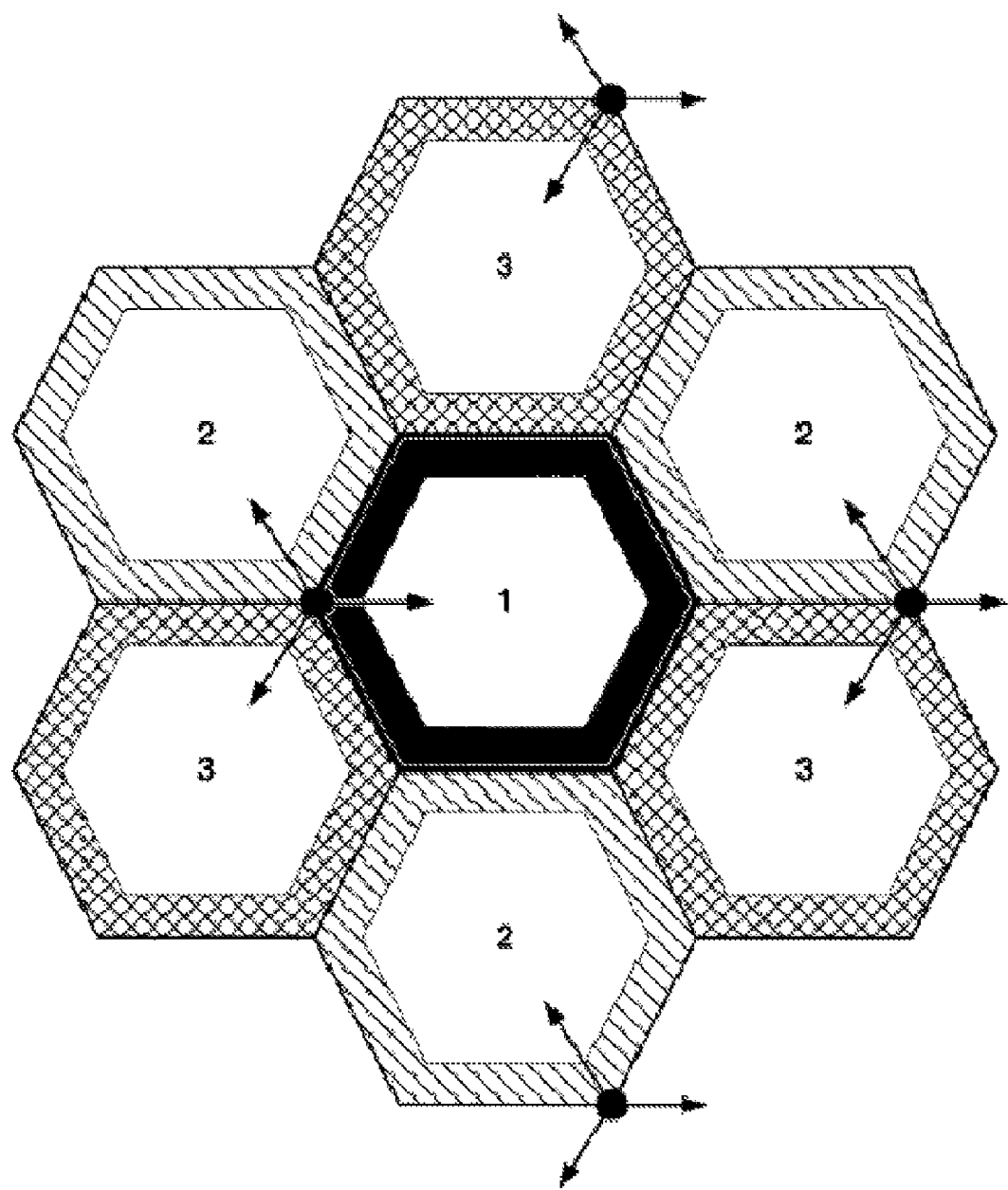
FIG. 3 shows a fractional frequency reuse scheme among a plurality of adjacent cells in a cellular system.

Now referring to FIG. 3, a diagram is shown utilizing a fractional frequency reuse scheme among a plurality of adjacent cells in a cellular system.

Figure 4:
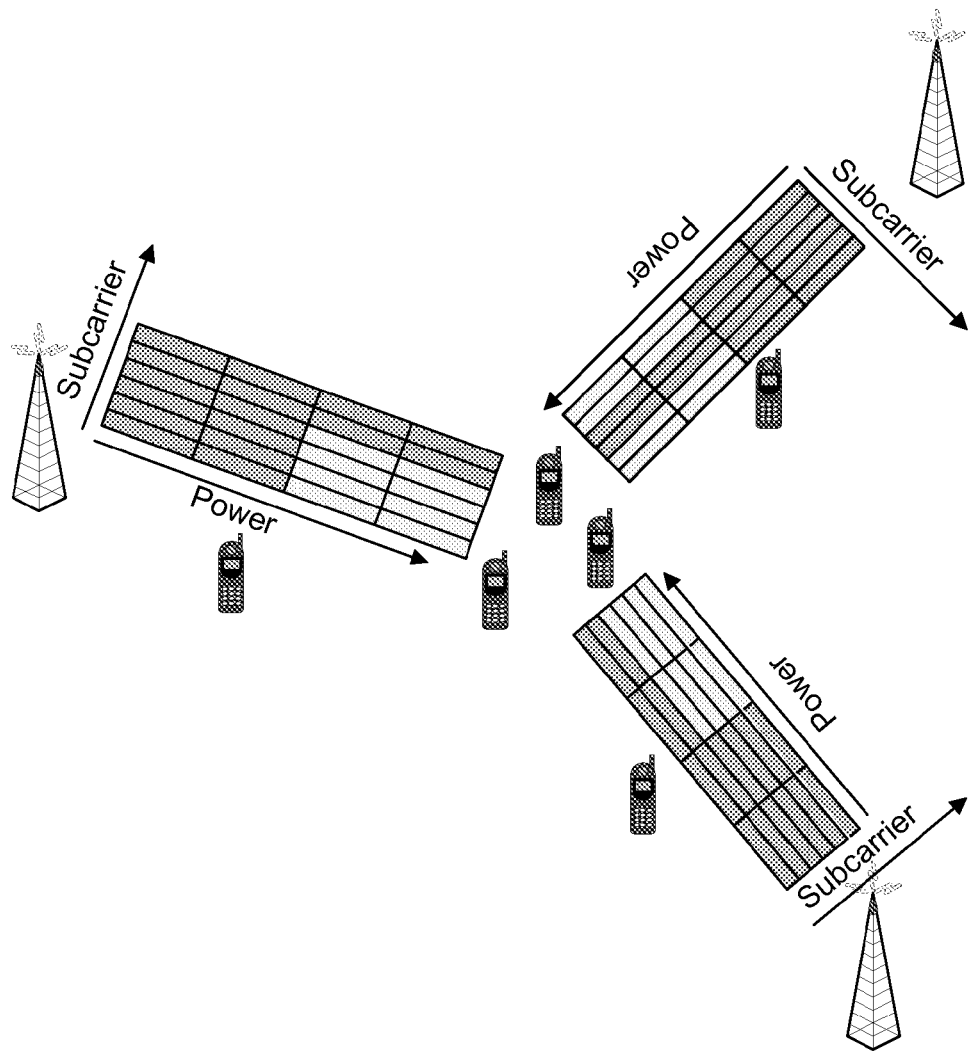
FIG. 4 shows a soft frequency reuse scheme among a plurality of adjacent cells in a cellular system.

Now referring to FIG. 4, a diagram is shown utilizing a soft frequency reuse scheme among a plurality of adjacent cells in a cellular system.

One embodiment of the present invention utilizes two types of tables to denote the resource assignment units according to two types of assignment. As shown in Table 1 as an illustrative example for the first type of assignment, called the localized assignment, the total bandwidth of the exemplary system is 5 MHz with a sampling rate of 4.9152 Msps (million samples per second). The fast Fourier transformation (FFT) size is 512, which is also the total number of subcarriers in frequency. The 512 subcarriers are divided into 32 contiguous minimal localized assignment frequency units. Each minimal localized assignment unit consists of 16 contiguous subcarriers over a plurality of OFDM symbols contiguous in time within a frame.

In a system where the control channels, such as the forward shared scheduling channels (F-SSCHs) that carry the assignment messages for each frame, are frequency division multiplexed (FDM) with the data channels, some minimal localized assignment units are assigned for the control channels and can not be used for the data channels.

In a system where the control channels are time division multiplexed (TDM) with the data channels, which is the case illustrated in Table 1, some OFDM symbols in a frame, for example, OFDM Symbol 0, are assigned to the control channels, while OFDM Symbols 1 to 7 are used for the data channels. In addition, the solid-shaded area in Table 1 may be used for a Guard Band, and therefore is not available for data channels. The Guard Band in the example given in Table 1 corresponds to subcarriers 224 to 287. Moreover, subcarrier 0 is the Direct Current (DC) tone of the baseband signal.

TABLE 1

| Total Bandwidth (e.g. 5 MHz Bandwidth with FFT Size or 512) | | | | | Data Frame OFDM Symbols 1 ~ 7 | Subcarrier Index |
|---|---|---|---|---|---|---|
| $L_0^1$ | | | | | $L_0^{32}$ | 0~15 |
| | | | | $L_0^{16}$ | $L_{16}^{32}$ | 16~31 |
| | | | $L_0^8$ | | $L_8^{32}$ | 32~47 |
| | | | | $L_8^{16}$ | $L_{24}^{32}$ | 48~63 |
| | | $L_0^4$ | | | $L_4^{32}$ | 64~79 |
| | | | | $L_4^{16}$ | $L_{20}^{32}$ | 80~95 |
| | | | $L_4^8$ | | $L_{12}^{32}$ | 96~111 |
| | | | | $L_{12}^{16}$ | $L_{28}^{32}$ | 112~127 |
| | $L_0^2$ | | | | $L_2^{32}$ | 128~143 |
| | | | | $L_2^{16}$ | $L_{18}^{32}$ | 144~159 |
| | | | $L_2^8$ | | $L_{10}^{32}$ | 160~175 |
| | | | | $L_{10}^{16}$ | $L_{26}^{32}$ | 176~191 |
| | | $L_2^4$ | | | $L_6^{32}$ | 192~207 |
| | | | | $L_6^{16}$ | $L_{22}^{32}$ | 208~223 |
| | | | $L_6^8$ | | | Guard Band 224~239 |
| | | | | $L_{14}^{16}$ | | 240~255 |
| | $L_1^2$ | | | | | 256~271 |
| | | | | $L_{15}^{16}$ | | 272~287 |
| | | | $L_7^8$ | | $L_{23}^{32}$ | 288~303 |
| | | | | $L_7^{16}$ | $L_7^{32}$ | 304~319 |
| | | $L_3^4$ | | | $L_{27}^{32}$ | 320~335 |
| | | | | $L_{11}^{16}$ | $L_{11}^{32}$ | 336~351 |
| | | | $L_3^8$ | | $L_{19}^{32}$ | 352~367 |
| | | | | $L_3^{16}$ | $L_3^{32}$ | 368~383 |
| | | $L_1^4$ | $L_5^8$ | | $L_{29}^{32}$ | 384~399 |
| | | | | $L_{13}^{16}$ | $L_{13}^{32}$ | 400~415 |
| | | | | $L_5^{16}$ | $L_{21}^{32}$ | 416~431 |
| | | | | | $L_5^{32}$ | 432~447 |
| | | | | $L_9^{16}$ | $L_{25}^{32}$ | 448~463 |
| | | | $L_1^8$ | | $L_9^{32}$ | 464~479 |
| | | | | $L_1^{16}$ | $L_{17}^{32}$ | 480~495 |
| | | | | | $L_1^{32}$ | 496~511 |

As shown in Table 1, a localized assignment unit is denoted as $L_k^N$, representing the kth divided assignment unit if the total available resource is divided into N equal-sized localized assignment units. In Table 1, two smaller localized assignment units with the same size and with a certain indices relationship (shown in equation 1) can be combined into a larger localized assignment unit. The generalized rule of combining two smaller localized assignment units into a larger localized assignment unit is $$L_k^N = L_k^{2N} + L_{k+N}^{2N} \tag{1}$$

Table 2 below shows an exemplary denotation of the radio resources with a second type of assignment, called the distributed assignment, for the same 5 MHz system. As shown in Table 2, the total radio resource within a frame is first divided by time into two groups of contiguous OFDM symbols. Then each group of OFDM symbols is further divided by time into two smaller groups of contiguous OFDM symbols. The division continues until each divided distributed assignment unit becomes one OFDM symbol. Then, each of the distributed assignment units is further divided by frequency into two smaller distributed assignment units that are interlaced in frequency subcarriers. The division then continues until reaching the size of the minimal distributed assignment unit.

control channels, while OFDM Symbols 1 to 7 are used for the data channels. In addition, the grid-shaded area in Table 2 may be used as a Guard Band, and therefore is not available for the data channels. The Guard Band in this example corresponds to subcarriers 224 to 287. Further, subcarrier 0 is the Direct Current (DC) tone of the baseband signal.

As shown in Table 2, a distributed assignment unit is denoted as $D_k^N$, representing the kth divided assignment unit if the total available resource is divided into N equal-sized distributed assignment units. In Table 2, two smaller distributed assignment units with the same size and a certain indices relationship (shown in equation 2) can be combined into a larger distributed assignment unit. The generalized rule of combining two smaller distributed assignment units into a larger distributed assignment unit is $$D_k^N = D_k^{2N} + D_{k+N}^{2N} \tag{2}$$

TABLE 2

| | | | Data Frame | | | | | |
|---|---|---|---|---|---|---|---|---|
| OFDM Symbol 0 | OFDM Symbol 1 | OFDM Symbol 2 | OFDM Symbol 3 | OFDM Symbol 4 | OFDM Symbol 5 | OFDM Symbol 6 | OFDM Symbol 7 | Subcarrier Index |
| | | | $D_0^1$ | | | | | |
| | $D_1^2$ | | | | $D_0^2$ | | | |
| $D_3^4$ | | $D_1^4$ | | $D_2^4$ | | $D_0^4$ | | |
| $D_7^8$ | $D_3^8$ | $D_5^8$ | $D_1^8$ | $D_6^8$ | $D_2^8$ | $D_4^8$ | $D_0^8$ | |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 0 |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 1 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 2 |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 3 |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 4 |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 5 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 6 |
| . | . | . | . | . | . | . | . | . |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 223 |
| | | | | | | | | 224 : 287 |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 288 |
| . | . | . | . | . | . | . | . | . |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 505 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 506 |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 507 |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 508 |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 509 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 510 |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 511 |

In a system where the control channels are frequency division multiplexed with the data channels, some subcarriers are assigned to the control channels and can not be used for the data channels. In a system where the control channels are time division multiplexed with the data channels, some OFDM symbols in a frame, for example, OFDM Symbol 0 as indicated by the solid-shaded area in Table 2, are assigned for the In the present invention, two types of assignments in the same frame are multiplexed by dividing the frame into two zones, wherein all first type of assignments are assigned in the first zone and all second type of assignments are assigned in the second zone. The demarcation between the two zones is implicitly indicated through the signaling for the individual assignment in a dynamic frame-by-frame manner.

Figure 5:
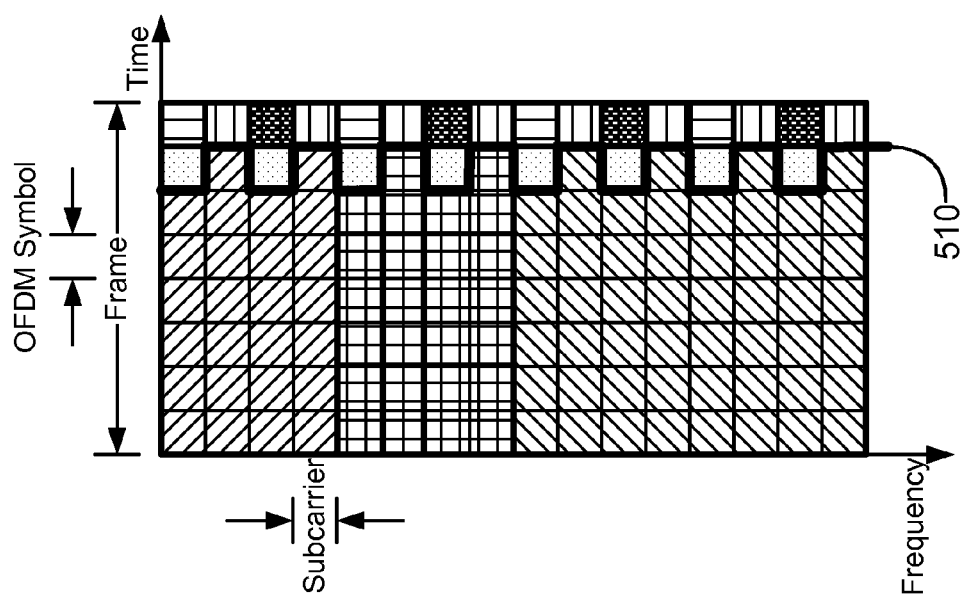
FIG. 5 is an exemplary embodiment of multiplexing two types of resource assignments in the same data frame according to the disclosure in a cross referenced application in connection with the present invention.

There are two strategies for multiplexing and demarcating the two types of assignments. According to the first demarcation strategy, as shown in FIG. 5, the base station fills up the resource space with the distributed assignments starting from the last OFDM symbol of the data frame, from the top to the bottom until all distributed assignments have been assigned, or until the last OFDM symbol of the data frame is filled up, then the base station starts to fill up the next OFDM symbol to the left with the distributed assignments. The base station continues in this manner until all distributed assignments have been assigned. That is where the distributed assignment zone ends.

The remaining area of the data frame is the localized assignment zone. The localized assignment zone starts from the beginning of the data frame and ends at the demarcation line 510 that is between the two zones. The distributed assignment zone starts from the end of the data frame and ends at the demarcation line 510. The two zones may share at most one OFDM symbol, during the time the two zones do not share the same frequency subcarriers. Therefore, the demarcation line 510 may be a straight line, or it may be a rectangular pulse-shaped line.

The demarcation line 510 is signaled by the base station implicitly by sending a Last Distributed Assignment message to all scheduled mobile stations. The Last Distributed Assignment is defined as the distributed assignment that is the farthest away in time from the beginning of the distributed assignment zone and the last in frequency location, among all distributed assignments within the same OFDM symbol. In this embodiment, the Last Distributed Assignment message is always sent on a first forward shared scheduling channel (F-SSCH) to eliminate any ambiguity and therefore improve the reliability of the signaling.

Figure 6:
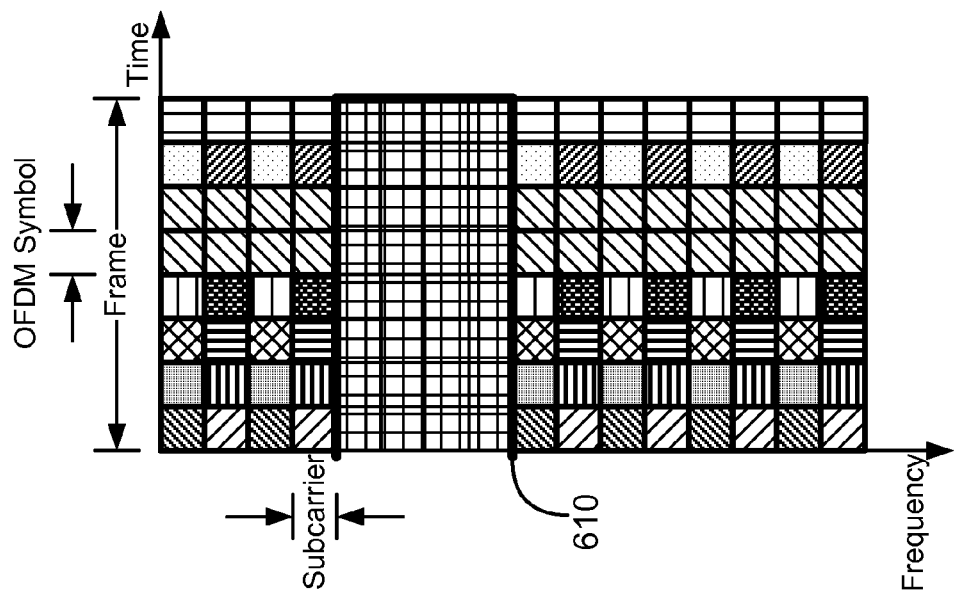
FIG. 6 shows a demarcation strategy when multiplexing two types of resource assignments in the same data frame according to the disclosure in a cross referenced application in connection with the present invention.

On the other hand, in the illustrative example shown in FIG. 6, the distributed assignment zone dominates the occupancy of the frame. Therefore, it would be very inefficient to assign any localized assignment according to the first strategy of multiplexing and demarcation as described above. In this case however, using the second strategy of multiplexing and demarcating the two types of assignments, the demarcation line becomes the boundary of all the resource assigned with the localized assignments. Therefore, the demarcation line is after all the localized assignments.

Choosing which strategy of multiplexing and demarcation is used depends on whether the occupancy of the distributed assignment zone has exceeded a certain threshold, which can be derived from the Last Distributed Assignment message by the mobile stations.

The present invention provides unique methods for interference mitigation in an OFDMA-based communication system. In the cross referenced application entitled "Method and Apparatus for Wireless Resource Allocation", a system is allowed to use frequency reuse, for example by assigning localized assignments using different frequency subbands by different base stations. Moreover, the same cross referenced application also provides unique dynamic time division multiplexing (TDM) with novel signaling of the distributed assignment zone. The present invention discloses two strategies for interference mitigation in a cellular communication system, namely "Interference Avoidance" and "Interference Randomization". Each of these strategies is described in greater detail hereinafter.

Figure 7C:
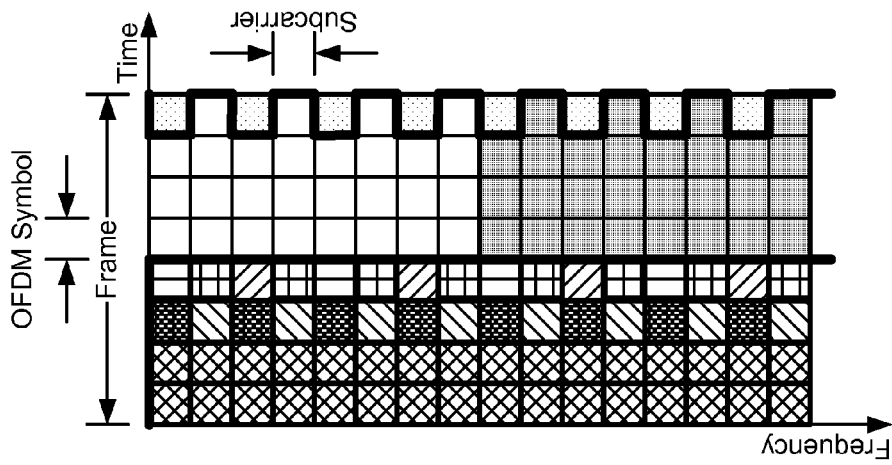
FIGS. 7A, 7B, and 7C together illustrate an embodiment of interference avoidance according to the present invention.
Figure 7B:
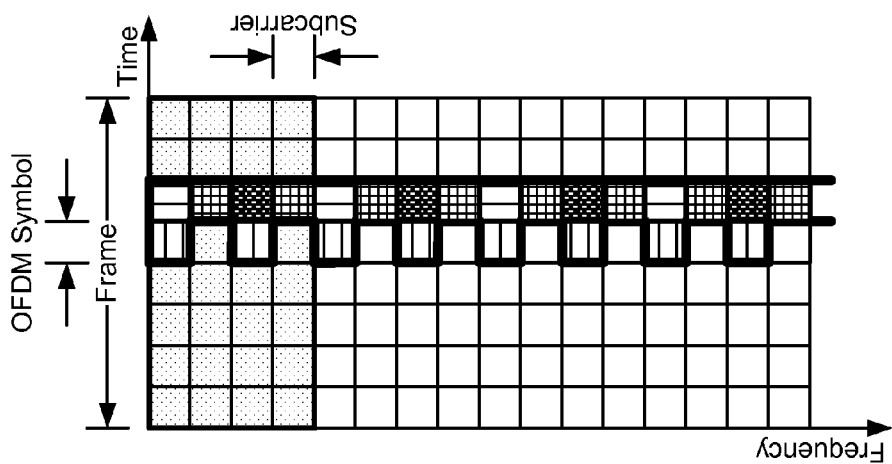
Figure 7A:
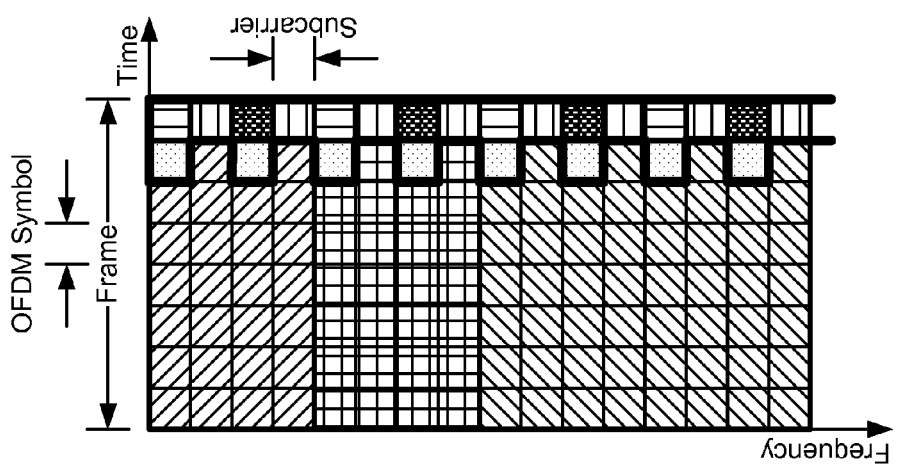

Referring now to FIGS. 7A, 7B, and 7C, one embodiment of Interference Avoidance is described. FIGS. 7A, 7B, and 7C show three different Base Stations (BS). In this embodiment, BS 700 is fully loaded, BS 702 is lightly loaded, and BS 704 has more distributed assignments that results in the zone wrapping around the data frame. However, BS 700, BS 702, and BS 704, use different time offsets for the beginning of the distributed assignment zone within a frame. Therefore, the distributed assignment zones for each of the BSs 700, 702, and 704 benefit from less interference from the other two base stations.

In one embodiment, time offset for the beginning of the distributed assignment zone may be indicated by a signaling message in a superframe preamble, which happens once in each of a plurality of data frames. In another embodiment, the time offset for the beginning of the distributed assignment zone may be indicated by the First Distributed Assignment on a frame-by-frame base. The First Distributed Assignment is defined as the distributed assignment that occupies the very beginning of a distributed assignment zone; therefore the assignment message for the First Distributed Assignment indicates where the distributed assignment zone begins.

For example, as shown in FIG. 7B, a distributed assignment zone begins from the sixth OFDM symbol in the frame, which is OFDM Symbol 5 as denoted in Table 2 above. The Node Index in the First Distributed Assignment message may be $D_2^4$, $D_2^8$, $D_2^{16}$, or $D_2^{32}$.

Furthermore, to reduce the ambiguity of detecting the First Distributed Assignment, if the First Distributed Assignment exists in the frame, the First Distributed Assignment is always sent on the second F-SSCH, which is different from the first F-SSCH that carries the Last Distributed Assignment, except when there is only one distributed assignment in the frame. When there is only one distributed assignment in the frame, the First Distributed Assignment, which is also the Last Distributed Assignment, is sent on the first F-SSCH.

Meanwhile, the second F-SSCH carries one localized assignment message with sufficient power for all scheduled mobile stations to decode the second F-SSCH correctly if at least one localized assignment exists in the frame. The mobile stations understand that the absence of a distributed assignment message on the second F-SSCH means that only one distributed assignment exists in the frame. As shown in FIGS. 7A, 7B, and 7C, the localized assignment zone begins after the beginning of the distributed assignment zone and continues until the demarcation line. If the localized assignment zone reaches the end of the data frame before reaching the demarcation line as shown in FIG. 7B, the localized assignment zone wraps around the data frame and continues from the beginning of the data frame until the demarcation line.

Co-located sectors may use the same beginning for the distributed assignment zone in order to facilitate macro diversity transmission with the distributed assignments. In addition, if multicast or broadcast service is supported in the distributed assignment zone by a plurality of base stations, at least some portion of the distributed assignment zone among these base stations is aligned in time.

Referring now to FIGS. 8A, 8B and 8C, another embodiment of interference avoidance is disclosed. In this embodiment, the three base stations BS 802, BS 804, and BS 806 are lightly loaded, but are coordinated somewhat through backhaul. However, not all of the OFDM symbols in the distributed assignment zones, which all begin from the end of the data frame, will be used by the distributed assignments of each of the three BSs. Therefore, inter-cell interference can be avoided through time reuse.

Furthermore, since the localized assignment zones are significantly punctured by the virtually enlarged distributed assignment zones, the second demarcation strategy should be used in this case. In the example illustrated in FIGS. 8A and 8B, BS 802 and BS 804 send a dummy Last Distributed Assignment that occupies the end of the distributed assignment zone to indicate that the second demarcation strategy is used. A dummy Last Distributed Assignment message is sent on the first F-SSCH with a dummy MAC Index, to identify a mobile station that does not exist. However, in FIG. 8C, the Last Distributed Assignment sent by the BS 806 may be a dummy one or a real one.

Figure 9C:
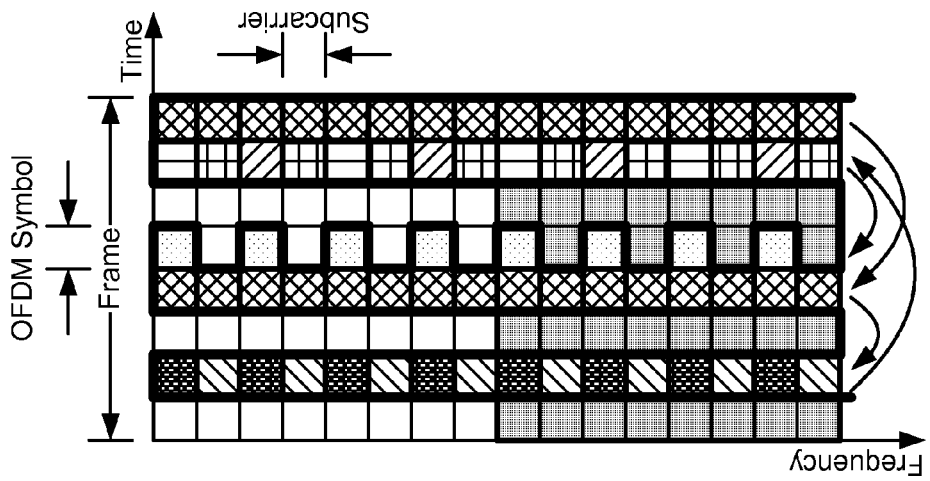
FIGS. 9A, 9B, and 9C together illustrate yet another embodiment of interference avoidance according to the present invention.
Figure 9B:
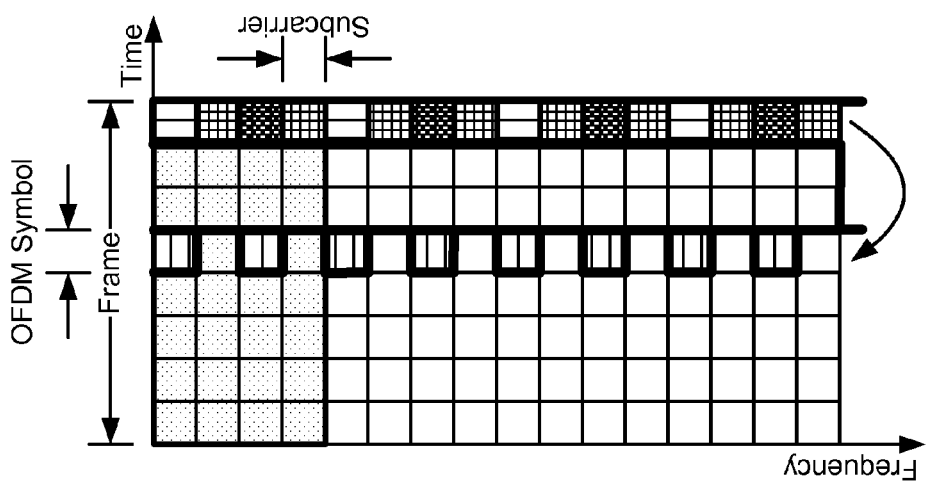
Figure 9A:
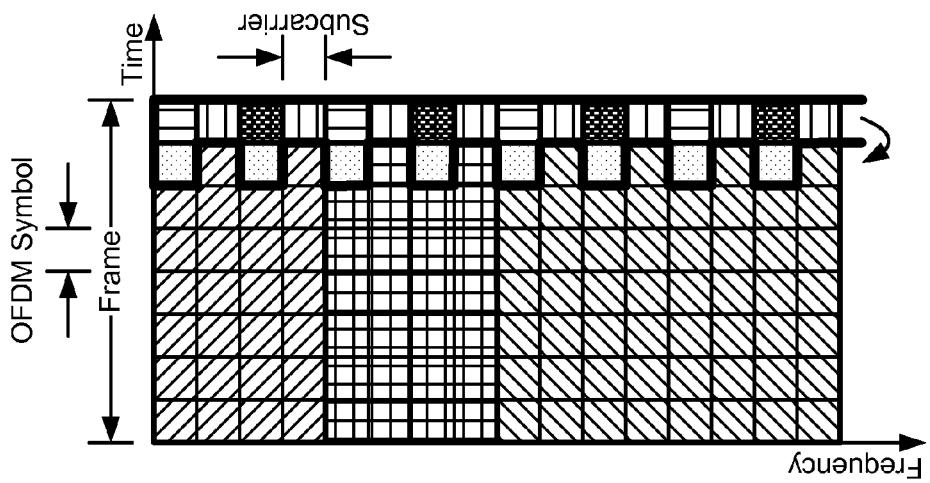

Referring now to FIGS. 9A, 9B, and 9C, yet another embodiment of interference avoidance is disclosed. As shown in FIGS. 9A, 9B, and 9C, the distributed assignment zone starts from the end of the data frame by default. This helps facilitate the macro diversity transmission. Although the first OFDM symbol in the distributed assignment zone is the last OFDM symbol in the data frame, the second OFDM in the distributed assignment zone may not be the next OFDM symbol in the distributed assignment zone. This is because the other OFDM symbols in the distributed assignment zone can hop to a different OFDM symbol for different base stations.

In this way, the OFDM symbol sequence in the distributed assignment zone is randomized between base stations, as shown in FIGS. 9A, 9B, and 9C. The arrows in FIGS. 9A, 9B, and 9C show the hopping sequence of the OFDM symbols progressing through the distributed assignment zone. In this embodiment, the localized assignment zone starts from the first OFDM symbol in the frame that is not completely occupied by the distributed assignment zone and the localized assignment zone continues towards the end of the data frame, skipping all the OFDM symbols along the way that have been completely occupied by the distributed assignment zone.

Co-located sectors may use the same OFDM symbol hopping sequence of the distributed assignment zone in order to facilitate macro diversity transmission. Moreover, if multicast or broadcast service is supported in the distributed assignment zone by more than one base station, at least some portion of the distributed assignment zone of these base stations will be aligned by time.

The interference avoidance schemes described above benefit a system that is lightly loaded. However, when a system becomes heavily loaded, i.e. when all the OFDM symbols in a frame are occupied by the traffic data among adjacent base stations, inter-cell interference may still exist. In this case, a technique called soft time reuse may be used on the interference avoidance schemes described above.

Figure 10:
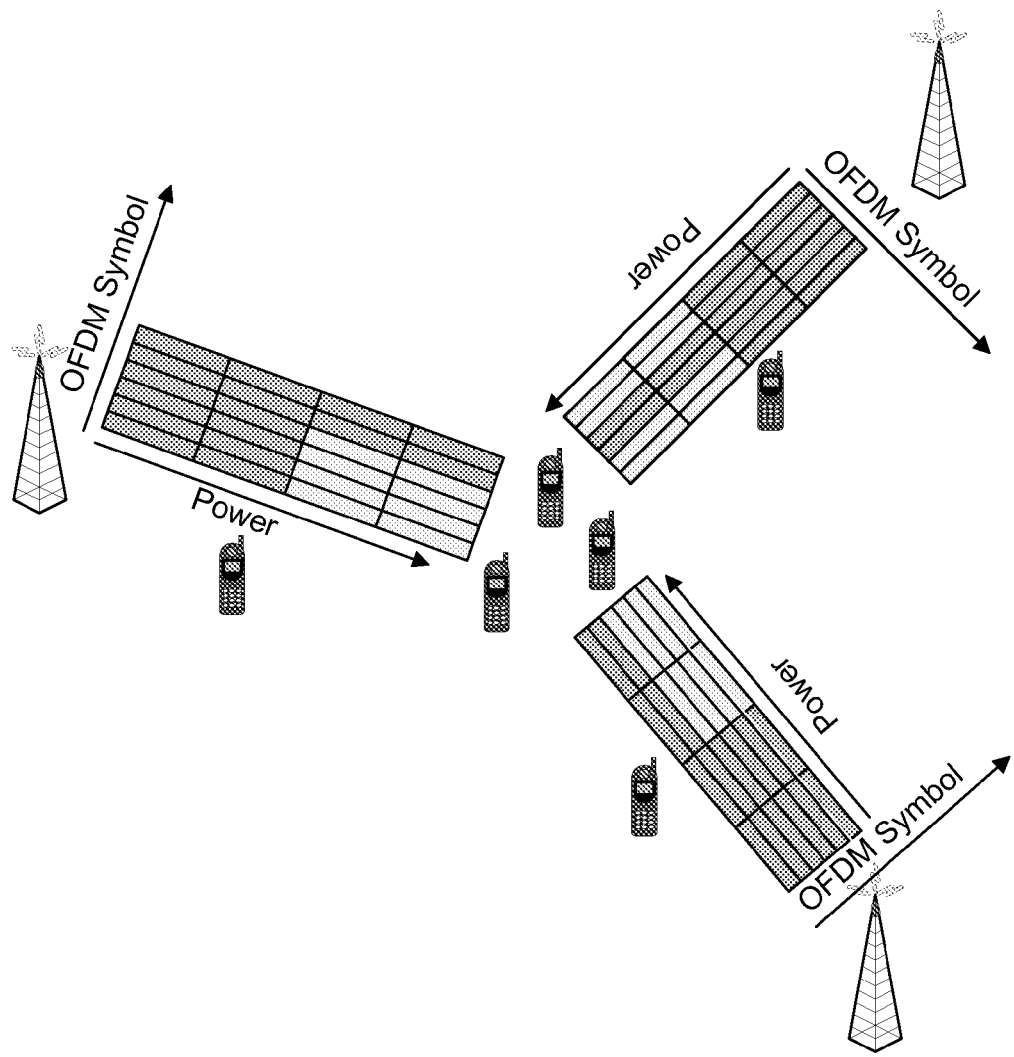
FIG. 10 illustrates an exemplary embodiment of soft time reuse in a cellular system according to the present invention.

Soft time reuse is very similar to the soft frequency reuse technique. FIG. 10 illustrates an exemplary embodiment of soft time reuse in a cellular system. As shown in FIG. 10, each base station may transmit at full power over OFDM symbols which are mutually exclusive among the interfering base stations. Additionally, each base station can transmit at limited power over the remaining OFDM symbols in the frame. However, some backhaul coordination may be needed among the interfering base stations.

For each of the reuse schemes described above, the reuse parameters can be either fixed or dynamic. If the reuse parameters are fixed, the spectrum efficiency may be low as the reuse parameters can not be adaptive to the changing channel conditions or traffic loading conditions. If the reuse parameters are dynamic, a signaling mechanism is needed to indicate the reuse parameters in a dynamic and efficient manner.

Interference Randomization may be involved when two distributed assignments from two adjacent base stations overlap with each other in both time and frequency. Constant interference may result—causing bursty transmission errors—which are difficult to correct by error-correction coding. However, randomizing the inter-cell interference in the distributed assignment zone helps avoid bursty transmission errors.

Figures 11A, 11B:
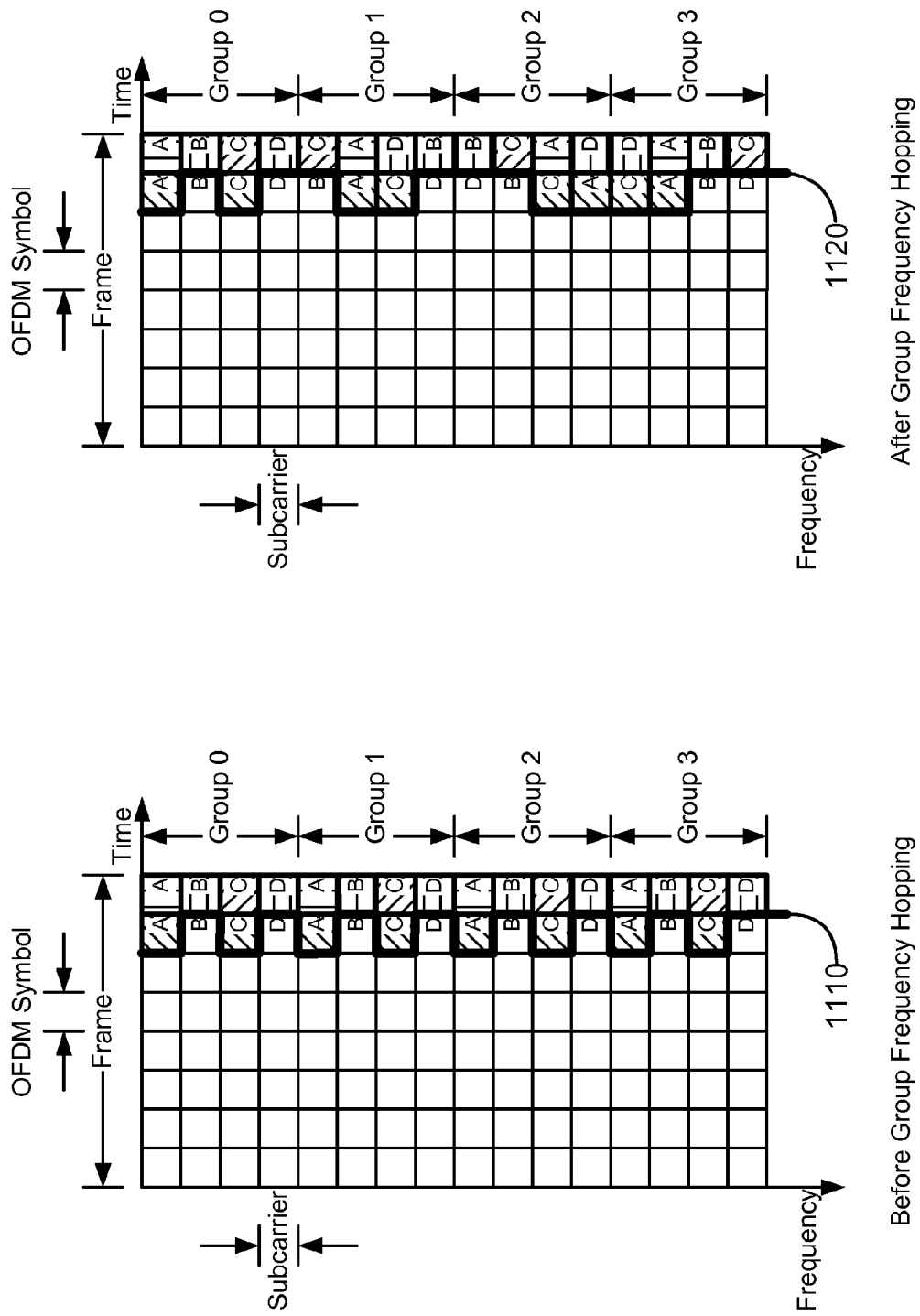
FIGS. 11A and 11B together illustrate an embodiment of interference randomization according to the present invention.

FIGS. 11A and 11B together illustrate an embodiment of interference randomization before and after group frequency hopping is applied, respectively. As illustrated in FIG. 11A, subcarriers of one particular minimal distributed assignment unit are evenly spaced. Every four contiguous subcarriers—which are indexed alphabetically with A, B, C, and D, within an OFDM symbol—form a group. The group is further indexed numerically in sequence along the frequency axis starting from zero at the top. All the subcarriers numbered A in the first OFDM symbol in the distributed assignment zone form one minimal distributed assignment unit, and can be denoted, for example, as $D_0^{32}$ using Table 2 above.

All subcarriers numbered B in the first OFDM symbol in the distributed assignment zone form another minimal distributed assignment unit, and can be denoted, for example, as $D_8^{32}$ using Table 2 above. All subcarriers numbered C in the first OFDM symbol in the distributed assignment zone form yet another minimal distributed assignment unit, and can be denoted, for example, as $D_{16}^{32}$ using Table 2 above. All the subcarriers numbered A and C in the first OFDM symbol in the distributed assignment zone can form a larger distributed assignment unit, and can be denoted, for example, as $D_0^{16}$ using Table 2 above. The demarcation line 1110 resembles a pulse-shaped line.

With the group frequency hopping applied, as illustrated in FIG. 11B, the permutation of the four subcarriers within each group can be randomized as a function of at least the Group Index, the OFDM Symbol Index, the Base Station Index, and the current frame number. The randomization of the permutation of the four subcarriers within each group is called group frequency hopping. Therefore, the subcarrier-time bins of one distributed assignment unit does not always overlap with the subcarrier-time bins of the same distributed assignment unit in an adjacent base station.

In this embodiment, the demarcation line 1120 resembles an irregular pulse-shaped line. As a result of the group frequency hopping, the interference is randomized among four possible resources and bursty transmission errors may be avoided. With group frequency hopping, the base station defines the Last Distributed Assignment based on the location of the resource of the distributed assignment before the group frequency hopping is applied to the distributed assignment. The mobile stations first determine which demarcation strategy is being used based on the Last Distributed Assignment.

For example, if the resource occupied by the Last Distributed Assignment reaches a certain benchmark of the frame, the second demarcation strategy is being used; otherwise, the first demarcation strategy is being used. If the second demarcation strategy is being used and the mobile station is scheduled with a localized assignment, the mobile station interprets the demarcation line to mean the resource assigned to the mobile station is based on the localized assignment.

If the second demarcation strategy is being used and the mobile station is scheduled with a distributed assignment, the mobile station interprets the demarcation line by all the localized assignment messages that the mobile station correctly decodes. Then the mobile station locates the assigned subcarrier-time bins based on the distributed assignment message for itself, excluding the subcarrier-time bins occupied by the localized assignment zone and without applying the group frequency hopping. The mobile station applies the group frequency hopping to the located subcarrier-time bins to determine the final locations of all of its assigned subcarrier-time bins.

If the first demarcation strategy is being used and the mobile station is scheduled with a distributed assignment, the mobile station first locates its assigned subcarrier-time bins based on the distributed assignment message for itself without applying the group frequency hopping. Then the mobile station applies the group frequency hopping to the located subcarrier-time bins to determine the final locations of all its assigned subcarrier-time bins.

If the first demarcation strategy is being used and the mobile station is scheduled with a localized assignment, the mobile station first interprets the initial demarcation line based on the Last Distributed Assignment message without applying the group frequency hopping. If the demarcation line is a straight line, the mobile station then locates its assigned subcarrier-time bins within the localized assignment zone based on the localized assignment message. If the demarcation line is not a straight line, the mobile station first locates its assigned subcarrier-time bins within the localized assignment zone based on its localized assignment message without using the group frequency hopping. Then the mobile station applies the group frequency hopping to its assigned subcarrier-time bins that are in the same OFDM symbol shared by the distributed assignment zone to determine the final location of its assigned subcarrier-time bins.

Figures 12A, 12B:
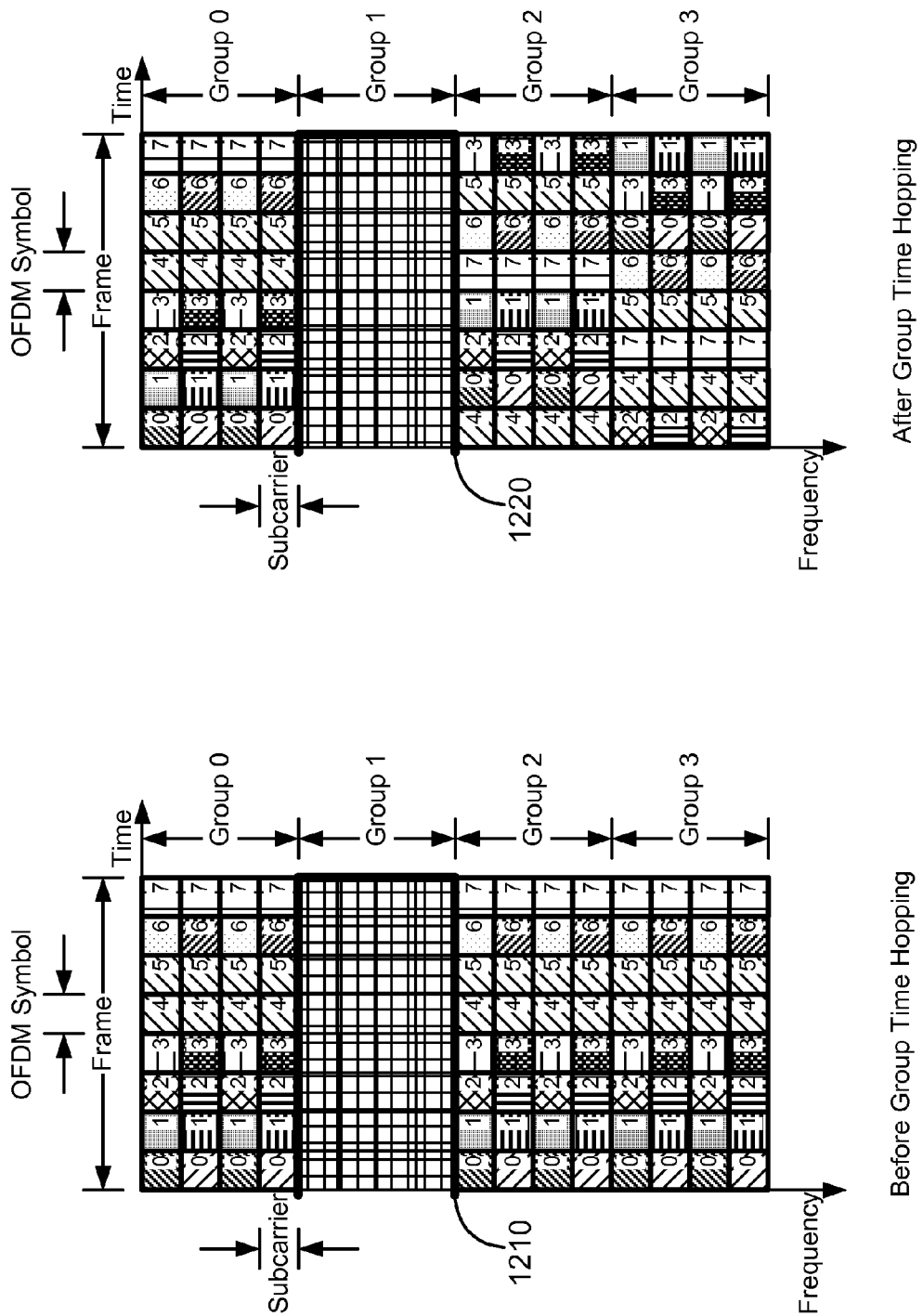
FIGS. 12A, 12B, 12C, and 12D together illustrate another embodiment of interference randomization according to the present invention.
Figure 12D:
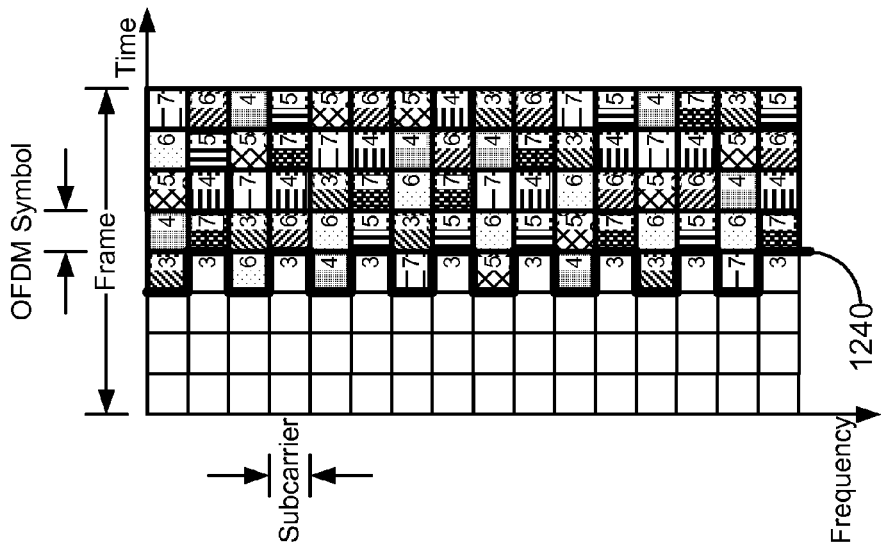
Figure 12C:
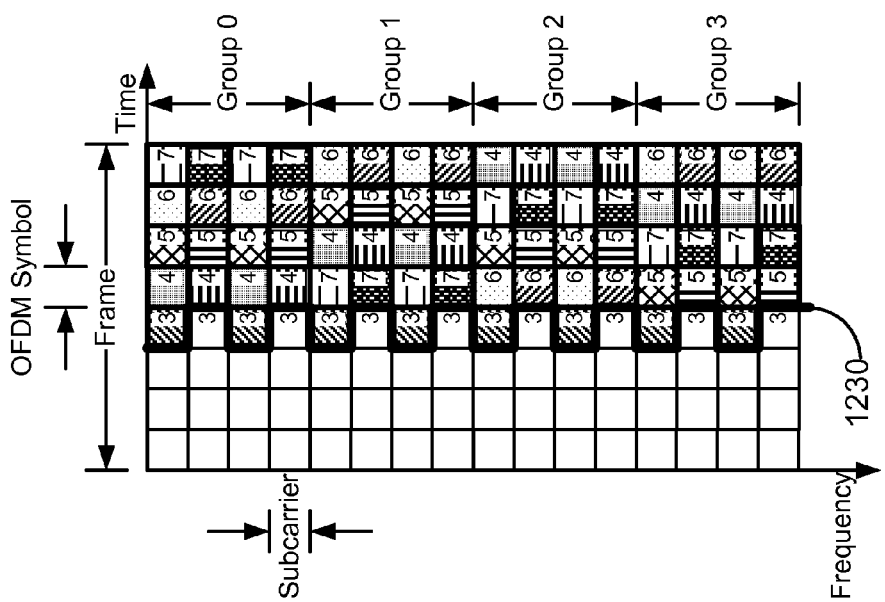

Now referring to FIGS. 12A, 12B, and 12C, another embodiment of interference randomization according to the present invention is disclosed. This embodiment discloses a method for randomizing inter-cell interference with group time hopping. In FIG. 12A, every four contiguous subcarriers within an OFDM symbol form a group. In addition, each group has two indices. Along the frequency axis, each group is indexed numerically in sequence starting from zero at the top. This index is called a group frequency index. Along the time axis, each group is further indexed.

For example, the number inside each bin, as shown in FIG. 12A, may be the index to the OFDM Symbol Index of the OFDM symbol that the group is located at. This index is called a group time index. Since the group time hopping is not applied in the example shown in FIG. 12A, the group time index shown in each subcarrier-time bin coincides with the OFDM Symbol Index of the OFDM symbol to the location of the subcarrier-time bin.

FIG. 12B shows an example of a method that applies the group time hopping wherein each group may exchange its location in time with another group that has the same group frequency index. Thus, the hopping happens only along the time axis.

FIG. 12C shows another example OFDM symbols that are shared by both the distributed assignment zone and the localized assignment zone. The groups of these symbols do not participate the group time hopping due to the fragmentation of that OFDM symbol. The permutation patterns of the each group among the groups that have the same group frequency index is a function of at least the group frequency index, the group time index, the base station index, the frame number, and the distributed assignment zone length along the time axis. As a result of the group time hopping, the interference is randomized among multiple possible resources and bursty transmission errors may be avoided.

With group time hopping, the base station defines the Last Distributed Assignment based on the location of the resource of the distributed assignment before the group time hopping is applied to the distributed assignment. The mobile station determines which demarcation strategy is being used based on the Last Distributed Assignment as described above.

If the second demarcation strategy is being used and the mobile station is scheduled with a localized assignment, the mobile station interprets the demarcation line to mean the resource assigned to the mobile station based on its localized assignment. If the second demarcation strategy is being used and the mobile station is scheduled with a distributed assignment, the mobile station interprets the demarcation line by all the localized assignment messages that the mobile station correctly decodes. Then the mobile station locates its assigned subcarrier-time bins based on its distributed assignment message, excluding the subcarrier-time bins occupied by the localized assignment zone and without applying the group time hopping. The mobile station then applies the group time hopping rules to the located subcarrier-time bins to determine the final locations of all of its assigned subcarrier-time bins.

The group time hopping rules not only include the hopping function but also include whether the groups in the OFDM symbol that is shared by the two zones participate in the group time hopping. If the first demarcation strategy is being used and the mobile station is scheduled with a distributed assignment, the mobile station first locates its assigned subcarrier-time bins based on its distributed assignment message without applying the group time hopping. Then the mobile station applies the group time hopping rules to the located subcarrier-time bins to determine the final locations of all its assigned subcarrier-time bins. If the first demarcation strategy is being used and the mobile station is scheduled with a localized assignment, the mobile station determines the demarcation line based on the Last Distributed Assignment message without applying the group time hopping. This is done because the group time hopping does not change the demarcation line for the mobile stations that are scheduled with the localized assignments.

FIG. 12D shows a modified time hopping scheme, called subcarrier time hopping, where the base station performs the time hopping along the time axis per the individual subcarrier, instead of per group of subcarriers. In this case, even the subcarriers that are in the distributed assignment zone or in the OFDM symbol that is shared by the two zones participate the time hopping. There are now two lengths for the distributed assignment zone in the time axis. The base station then applies the distributed assignment zone length according to each subcarrier in a function that calculates the time hopping pattern.

The group time hopping and the subcarrier time hopping described above also provide time diversity as each distributed assignment unit spreads over multiple OFDM symbols but still within the distributed assignment zone. Furthermore, these hopping schemes can be combined to further randomize inter-cell interference.

Figure 13A:
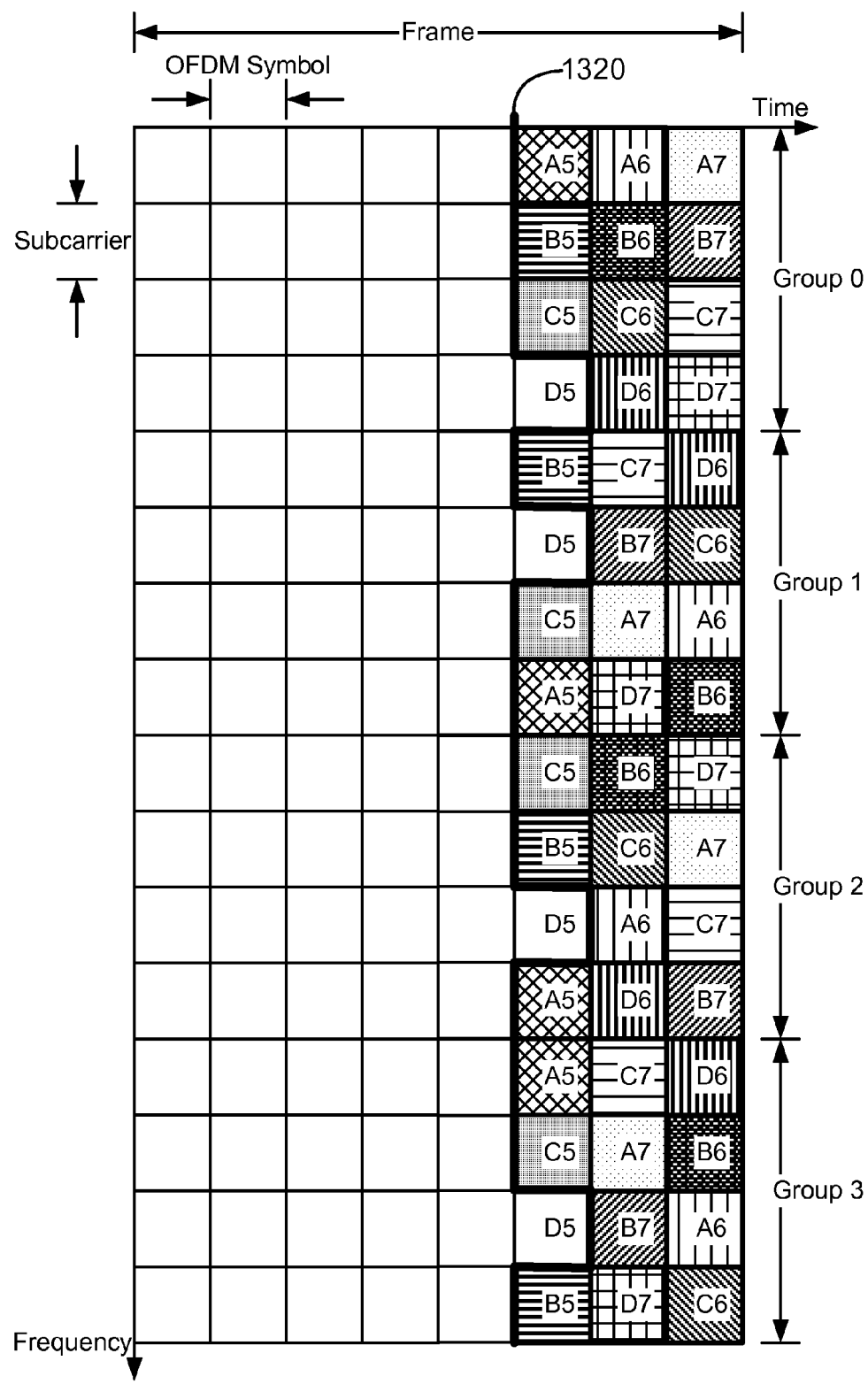
FIGS. 13A and 13B together illustrate yet another embodiment of interference randomization according to the present invention.
Figure 13B:
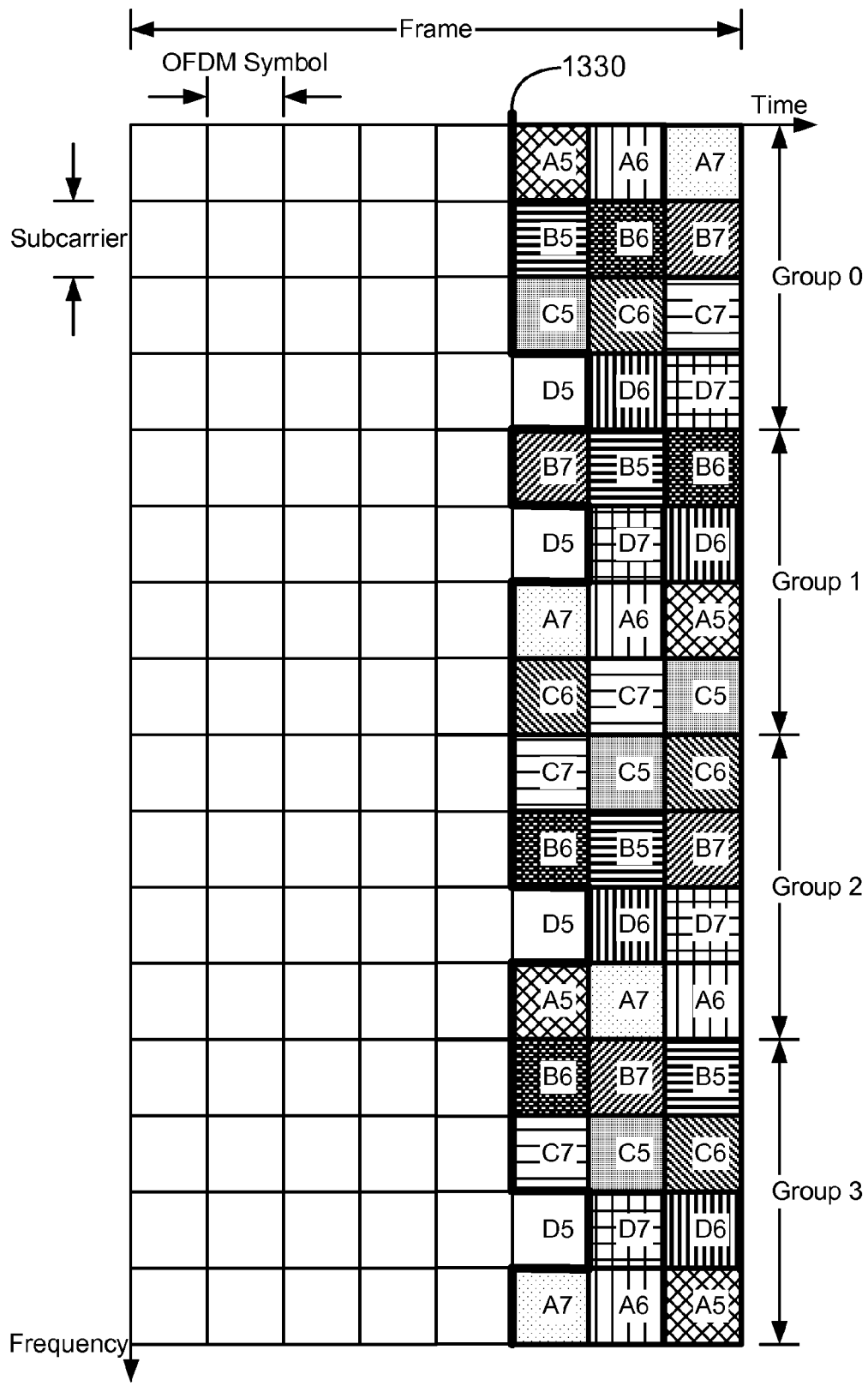

FIGS. 13A and 13B together illustrate yet another embodiment of interference randomization. FIG. 13A shows a scheme of combining the group frequency hopping as shown in FIG. 11B and the group time hopping as shown in FIG. 12B. FIG. 13B shows a scheme of combining the group frequency hopping as shown in FIG. 11B and the subcarrier time hopping as shown FIG. in 12D.

With the group frequency hopping and group or subcarrier time hopping of the present invention, the subcarrier-time bins assigned by each distributed assignment spread over both frequency and time randomly. However, bins also still remain within the distributed assignment zone, which is clearly separated from the localized assignment zone with a demarcation line. Examples are 1320 in FIG. 13A and 1330 in FIG. 13B. The mobile stations that are scheduled with the localized assignment only need to know where the demarcation line is but not what each distributed assignment occupies. While the conventional distributed assignment spreads the subcarrier-time bins for each distributed assignment over the entire data frame randomly, the mobile stations that are scheduled with the localized assignment need to know precisely what each distributed assignment occupies. Therefore, the present invention simplifies the hardware and software implementation at the mobile station receiver.

Co-located sectors may use the same group frequency hopping pattern and the same group time hopping pattern in order to facilitate macro diversity transmission with the distributed assignments. In addition, if the multicast or broadcast service is supported in the distributed assignment zone by a plurality of base stations, at least some portion of that distributed assignment zone may use the same group frequency hopping pattern and the same group time hopping pattern.

Any interference avoidance scheme, or a combination of schemes, as described in the present invention can be further combined with any interference randomization scheme or a combination of as described above.

In addition, any interference avoidance scheme, any interference randomization scheme, or combination, can be used on the forward link (e.g. from the base station to the mobile station) or the reverse link (e.g. from the mobile station to the base station).

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of assigning a radio resource in an OFDMA-based wireless communication system, the method comprising:
    dividing the radio resource within a frame in a base station into localized assignment units and distributed assignment units, the localized assignment units comprising first subcarriers contiguous in both time and frequency, the distributed assignment units comprising second subcarriers assigned to a first mobile station and a second mobile station being serviced by the base station, wherein each second subcarrier assigned to the first mobile station is spaced apart in frequency from a neighboring second subcarrier assigned to the first mobile station by other second subcarriers configured to be assigned to the second mobile station;
    grouping the localized assignment units into a first zone and the distributed assignment units into a second zone; and
    assigning the first and the second zones to the frame, wherein the grouping and assigning mitigate inter-cell interference using an interference avoidance scheme and/or an interference randomization scheme, wherein the grouping and assigning comprises:
        defining at least one parameter for the first subcarriers within the first zone, the at least one parameter being defined to mitigate inter-cell interference, and
        loading the first subcarriers within the first zone and the second subcarriers within the second zone according to the at least one parameter, wherein a first OFDM symbol in the second zone is a last OFDM symbol in the frame, and wherein a next OFDM symbol in the second zone is not a OFDM symbol immediately preceding the last OFDM symbol in the frame.

2. The method of claim 1, wherein the interference avoidance scheme comprises selecting different time offsets for a beginning of the second zone based on loading of the base station.

3. The method of claim 1, wherein the interference avoidance scheme comprises using time reuse and assigning a dummy message to identify a last distributed assignment unit of the second zone.

4. A method of assigning a radio resource in an OFDMA-based wireless communication system, the method comprising:
    dividing the radio resource within a frame in a base station into localized assignment units and distributed assignment units, the localized assignment units comprising first subcarriers contiguous in both time and frequency, the distributed assignment units comprising second subcarriers assigned to a first mobile station and a second mobile station being serviced by the base station, wherein each second subcarrier assigned to the first mobile station is spaced apart in frequency from a neighboring second subcarrier assigned to the first mobile station by other second subcarriers configured to be assigned to the second mobile station;
    grouping the localized assignment units into a first zone and the distributed assignment units into a second zone; and
    assigning the first and the second zones to the frame, wherein the grouping and assigning mitigate inter-cell interference using an interference avoidance scheme and/or an interference randomization scheme, wherein the grouping and assigning comprises:
        defining at least one parameter for the first subcarriers within the first zone, the at least one parameter being defined to mitigate inter-cell interference, and
        loading the first subcarriers within the first zone and the second subcarriers within the second zone according to the at least one parameter, wherein a fixed number of contiguous subcarriers within an OFDM symbol form a group, wherein a permutation of the fixed number of contiguous subcarriers within each group is randomized as a function of one of a group index, an OFDM symbol index, a base station index, or a frame number.

5. A method of assigning a radio resource in an OFDMA-based wireless communication system, the method comprising:
    dividing the radio resource within a frame in a base station into localized assignment units and distributed assignment units, the localized assignment units comprising first subcarriers contiguous in both time and frequency, the distributed assignment units comprising second subcarriers assigned to a first mobile station and a second mobile station being serviced by the base station, wherein each second subcarrier assigned to the first mobile station is spaced apart in frequency from a neighboring second subcarrier assigned to the first mobile station by other second subcarriers configured to be assigned to the second mobile station;
    grouping the localized assignment units into a first zone and the distributed assignment units into a second zone; and
    assigning the first and the second zones to the frame, wherein the grouping and assigning mitigate inter-cell interference using an interference avoidance scheme and/or an interference randomization scheme, wherein the grouping and assigning comprises:

defining at least one parameter for the first subcarriers within the first zone, the at least one parameter being defined to mitigate inter-cell interference, and loading the first subcarriers within the first zone and the second subcarriers within the second zone according to the at least one parameter, wherein a fixed number of contiguous subcarriers within an OFDM symbol form a group, wherein each group exchanges its location in time with another group that has a substantially similar group frequency index.

6. A method for an OFDMA-based wireless communication system, the method comprising:

providing at least a frame in a base station to a plurality of mobile stations;

dividing the frame into a plurality of subcarriers arranged into a first zone and a second zone, the first zone comprising a plurality of localized assignment units, wherein each localized assignment unit comprises subcarriers that are contiguous in both time and frequency, the second zone comprising a plurality of distributed assignment units, wherein each distributed assignment unit comprises subcarriers assigned to a mobile station of the plurality of mobile stations that are spaced apart in frequency by other subcarriers;

defining at least one parameter for the plurality of subcarriers within the first zone, one of the at least one parameter being defined to mitigate inter-cell interference; and loading the plurality of subcarriers within the first zone and the second zone according to one of the at least one parameter, wherein a first OFDM symbol in the second zone is a last OFDM symbol in the frame, and wherein a next OFDM symbol in the second zone is not a OFDM symbol immediately preceding the last OFDM symbol in the frame.

7. A method for an OFDMA-based wireless communication system, the method comprising:

providing at least a frame in a base station to a plurality of mobile stations;

dividing the frame into a plurality of subcarriers arranged into a first zone and a second zone, the first zone comprising a plurality of localized assignment units, wherein each localized assignment unit comprises subcarriers that are contiguous in both time and frequency, the second zone comprising a plurality of distributed assignment units, wherein each distributed assignment unit comprises subcarriers assigned to a mobile station of the plurality of mobile stations that are spaced apart in frequency by other subcarriers;

defining at least one parameter for the plurality of subcarriers within the first zone, one of the at least one parameter being defined to mitigate inter-cell interference; and loading the plurality of subcarriers within the first zone and the second zone according to one of the at least one parameter, wherein a fixed number of contiguous subcarriers within an OFDM symbol form a group, wherein a permutation of the fixed number of contiguous subcarriers within each group is randomized as a function of one of a group index, an OFDM symbol index, a base station index, or a frame number.

8. The method of claim 7 wherein one of the at least one parameter includes a time reuse parameter.

9. The method of claim 7 wherein the first zone is dynamically assigned radio resources.

10. The method of claim 9, wherein one of the at least one parameter includes a frequency reuse parameter, and wherein the frequency reuse parameter establishes a plurality of schemes for dynamically loading the subcarriers within at least one of the first zone and the second zone.

11. The method of claim 9, wherein one of the at least one parameter includes a frequency reuse parameter, and wherein both the time reuse and the frequency parameter establish a plurality of schemes for dynamically loading the subcarriers within at least one of the first zone and the second zone.

12. The method of claim 9 wherein one of the at least one parameter includes a group frequency hopping parameter that establishes a plurality of schemes for dynamically loading the subcarriers within at least one of the first zone and the second zone.

13. The method of claim 9 wherein one of the at least one parameter includes a soft time reuse parameter that establishes a plurality of schemes for dynamically loading the subcarriers within at least one of the first zone and the second zone.

14. The method of claim 9 wherein one of the at least one parameter includes a group time hopping parameter that establishes a plurality of schemes for dynamically loading the subcarriers within at least one of the first zone and the second zone.

15. The method of claim 9 wherein one of the at least one parameter includes a subcarrier time hopping parameter that establishes a plurality of schemes for dynamically loading the subcarriers within at least one of the first zone and the second zone.

16. The method of claim 7 wherein dividing the frame into a plurality of subcarriers arranged into a first zone and a second zone comprises assigning a demarcation line within the frame to divide the plurality of subcarriers.

17. A method for an OFDMA-based wireless communication system, the method comprising:

providing at least a frame in a base station to a plurality of mobile stations;

dividing the frame into a plurality of subcarriers arranged into a first zone and a second zone, the first zone comprising a plurality of localized assignment units, wherein each localized assignment unit comprises subcarriers that are contiguous in both time and frequency, the second zone comprising a plurality of distributed assignment units, wherein each distributed assignment unit comprises subcarriers assigned to a mobile station of the plurality of mobile stations that are spaced apart in frequency by other subcarriers;

defining at least one parameter for the plurality of subcarriers within the first zone, one of the at least one parameter being defined to mitigate inter-cell interference; and loading the plurality of subcarriers within the first zone and the second zone according to one of the at least one parameter, wherein a fixed number of contiguous subcarriers within an OFDM symbol form a group, wherein each group exchanges its location in time with another group that has a substantially similar group frequency index.

18. The method of claim 17 wherein one of the at least one parameter includes a time reuse parameter.

19. The method of claim 17 wherein one of the at least one parameter includes a frequency reuse parameter.

20. The method of claim 17 wherein one of the at least one parameter includes both a frequency reuse and a time reuse parameter.

21. The method of claim 17 wherein the first zone is dynamically assigned radio resources.

22. The method of claim 21 wherein one of the at least one parameter includes a frequency reuse parameter that establishes a plurality of schemes for dynamically loading the subcarriers within at least one of the first zone and the second zone.

23. The method of claim 21 wherein one of the at least one parameter includes a time reuse parameter that establishes a plurality of schemes for dynamically loading the subcarriers within at least one of the first zone and the second zone.

24. The method of claim 21 wherein one of the at least one parameter includes both a time reuse and a frequency parameter that establishes a plurality of schemes for dynamically loading the subcarriers within at least one of the first zone and the second zone.

25. The method of claim 21 wherein one of the at least one parameter includes a group frequency hopping parameter that establishes a plurality of schemes for dynamically loading the subcarriers within at least one of the first zone and the second zone.

26. The method of claim 21 wherein one of the at least one parameter includes a soft time reuse parameter that establishes a plurality of schemes for dynamically loading the subcarriers within at least one of the first zone and the second zone.

27. The method of claim 21 wherein one of the at least one parameter includes a group time hopping parameter that establishes a plurality of schemes for dynamically loading the subcarriers within at least one of the first zone and the second zone.

28. The method of claim 21 wherein one of the at least one parameter includes a subcarrier time hopping parameter that establishes a plurality of schemes for dynamically loading the subcarriers within at least one of the first zone and the second zone.

29. The method of claim 17 wherein dividing the frame into a plurality of subcarriers arranged into a first zone and a second zone comprises assigning a demarcation line within the frame to divide the plurality of subcarriers.

* * * * *